(12) United States Patent
Andersson et al.

(10) Patent No.: US 9,674,266 B2
(45) Date of Patent: Jun. 6, 2017

(54) METHOD FOR ADAPTIVE STREAMING, LOCAL STORING AND POST-STORING QUALITY INCREASE OF A CONTENT FILE

(75) Inventors: Ola Andersson, Sao Paolo (BR); Jan Erik Lindquist, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 462 days.

(21) Appl. No.: 14/351,954

(22) PCT Filed: Oct. 17, 2011

(86) PCT No.: PCT/SE2011/051237
§ 371 (c)(1),
(2), (4) Date: Apr. 15, 2014

(87) PCT Pub. No.: WO2013/058684
PCT Pub. Date: Apr. 25, 2013

(65) Prior Publication Data
US 2014/0304377 A1    Oct. 9, 2014

(51) Int. Cl.
*G06F 15/16* (2006.01)
*H04L 29/08* (2006.01)
*H04L 29/06* (2006.01)

(52) U.S. Cl.
CPC .......... *H04L 67/06* (2013.01); *H04L 65/1083* (2013.01); *H04L 65/4084* (2013.01);
(Continued)

(58) Field of Classification Search
CPC ... H04L 65/1083; H04L 65/608; H04L 67/06; H04L 65/604; H04L 65/80; H04L 65/4084
See application file for complete search history.

(56) References Cited

U.S. PATENT DOCUMENTS

2008/0155623 A1* 6/2008 Ota .................. H04N 7/173
725/109
2011/0082914 A1* 4/2011 Robert ............... H04N 21/4788
709/219

(Continued)

FOREIGN PATENT DOCUMENTS

WO   WO 2011/0149672 A2   12/2011

OTHER PUBLICATIONS

International Search Report for PCT Application No. PCT/SE2011/051237, mailed Jul. 6, 2012, 4 pages.
(Continued)

*Primary Examiner* — Ario Etienne
*Assistant Examiner* — Kidest Mendaye
(74) *Attorney, Agent, or Firm* — Sage Patent Group

(57) ABSTRACT

A method includes monitoring a bandwidth currently available for streaming of a segment file pertaining to the selected content asset from a server to the client. A selected content asset is registered by receiving a user-originating request identifying the selected content asset. An adequate segment quality level to be requested is selected based on the currently available bandwidth. A segment to be requested is adaptively selected contingent upon the local availability or quality level of file segments. The segment is requested from the content providing server in the specified adaptively selected adequate segment quality level. The requested segment is received in a current segment quality level corresponding to the adaptively selected adequate quality level, stored locally associated with information regarding its quality level. Received file segments pertaining to the content file are rendered in a manner as specified by a received manifest file pertaining to the content file.

17 Claims, 4 Drawing Sheets

(52) U.S. Cl.
CPC .......... *H04L 65/604* (2013.01); *H04L 65/608* (2013.01); *H04L 65/80* (2013.01)

(56) References Cited

U.S. PATENT DOCUMENTS

| | | | |
|---|---|---|---|
| 2011/0082946 A1* | 4/2011 | Gopalakrishnan .. | H04L 65/4084 709/231 |
| 2012/0042050 A1* | 2/2012 | Chen .................... | H04L 65/607 709/219 |
| 2012/0042091 A1* | 2/2012 | McCarthy .......... | H04N 7/17318 709/231 |
| 2012/0324122 A1* | 12/2012 | Miles ................. | H04L 65/4084 709/231 |
| 2013/0103849 A1* | 4/2013 | Mao ................... | H04N 21/8456 709/231 |
| 2013/0246643 A1* | 9/2013 | Luby ................ | H04N 21/23439 709/231 |
| 2013/0254418 A1* | 9/2013 | Zhang .................... | H04L 65/60 709/231 |

OTHER PUBLICATIONS

Written Opinion of the International Searching Authority for PCT Application No. PCT/SE2011/051237, mailed Jul. 6, 2012, 8 pages.
3GPP TS 26.234 V10.0.0 (Mar. 2011); "3$^{rd}$ Generation Partnership Project; Technical Specification Group Services and System Aspects; Transparent end-to-end Packet-switched Streaming Service (PSS); Protocols and codecs" (Release 10); 650 Route des Lucioles—Sophia Antipolis Valbonne—France; 18 pages.

* cited by examiner

METHOD FOR ADAPTIVE STREAMING, LOCAL STORING AND POST-STORING QUALITY INCREASE OF A CONTENT FILE

CROSS REFERENCE TO RELATED APPLICATION

This application is a 35 U.S.C. §371 national stage application of PCT International Application No. PCT/SE2011/051237, filed on 17 Oct. 2011, the disclosure and content of which is incorporated by reference herein in its entirety. The above-referenced PCT International Application was published in the English language as International Publication No. WO 2013/058684 A1 on 25 Apr. 2013.

TECHNICAL FIELD

The present invention relates generally to a method and an apparatus for adaptive streaming of content. More specifically it relates to adaptive streaming, adaptive local storing and adaptive quality increase in streamed content.

BACKGROUND

Adaptive HTTP streaming is a technique used to stream multimedia, and in particular video, over the network. It is characterized by very little buffering, fast start time and a good user experience for both high-end and low-end connections.

The difference between adaptive HTTP streaming and its predecessor, progressive download, is the following. In progressive download the server makes available the content file in one bit rate quality version only. The client plays the downloaded file as it arrives in the only available bit rate. If the bit rate exceeds the available bandwidth the client will not get data fast enough to play the content file in real-time, thus it will pause the rendering of the content, e.g. the video or piece of music, while buffering data.

In adaptive HTTP streaming the client downloads small segments of the content file at a time sequentially until all data comprised in the content file is downloaded. One segment typically corresponds to some-10 seconds of rendered, or "played-back", content. On the server side each segment to be sent is duplicated into several bit rate levels, corresponding to several levels of rendering quality. A server can select to send to a client a version of the content file with a bit rate level that at least does not exceed the client's available bandwidth. This adaptive HTTP streaming results in smoother rendering, i.e. playback, with a reduction in buffering-related playback pauses, independently of bandwidth. The playback quality, however, will vary, since it is directly related to the selected bit rate.

For adaptive streaming purposes, the multiple segment bit rates and segment partition timing information are described in a so called manifest file. Based on the manifest file the client is enabled to request and/or retrieve the most appropriate segments one by one. Among the used adaptive streaming technologies can be mentioned "HTTP Live Streaming", "Smooth Streaming" and "3GPP Adaptive HTTP streaming" (TS 26.234 and TS 26.244).

However, HTTP Adaptive Streaming does not adequately support permanent local storing of the streamed content. Further, if permanently stored in the client, the playback quality level, and quality variation of such content retrieved through adaptive streaming will remain as permanently as the permanently stored segments of variable bit rate. There is therefore a need for a method and an arrangement for increased support for local storing of streamed content, so as to circumvent or at least diminish the problems as mentioned above

SUMMARY

It is the object to obviate at least some of the above disadvantages and provide improved inter-related methods, apparatuses and computer media products avoiding the above mentioned drawbacks.

A first aspect of the present invention is a method in a adaptive streaming enabled client for adaptive streaming, local storing and post-storing quality increase of a content file rendition of an associated selected content asset. The method comprises the steps of monitoring a bandwidth currently available for streaming of a segment file pertaining to the selected content asset from a server to the client;

registering a selected content asset by receiving a user-originating request identifying the selected content asset;

selecting an adequate segment quality level to be requested based on the currently available bandwidth;

adaptively selecting a segment to be requested contingent upon the local availability or quality level of file segments;

requesting the segment from the content providing server in the specified adaptively selected adequate segment quality level;

receiving the requested segment in a current segment quality level corresponding to the adaptively selected adequate quality level;

storing locally the received segment in association with information regarding its quality level; and rendering received file segments pertaining to the content file in a manner as specified by a received manifest file pertaining to the content file.

The registering step may comprise the further steps of receiving a uniform resource locator specifying the location of a rendition of the identified selected content asset; and determining, based on the uniform resource locator, whether the rendition format is streamable.

The registering step may further comprise the further step of investigating whether a rendition of the selected content asset is stored locally.

The selecting step may further comprise selecting a file segment to be requested contingent upon a consecutive segment order specified in the manifest file; and/or selecting a file segment (s[x]) to be requested contingent upon its current associated quality level.

The requesting step may be repeated for each next-to-play segment, and further may performed only if the selected segments current level of quality is lower than the selected adequate level of quality.

The storing locally step may comprise the further step of selecting storage location based on previously received instruction, thereby enabling the user of the client to indicate whether or not local storage is desired.

A second aspect of the invention is a client enabled for adaptive streaming, local storing and post-storing quality increase of a content file rendition of an associated selected content asset. The client comprises a central processing unit, a memory unit, and a network interface. The processing unit and memory unit further implement an adaptive streaming unit, a media player unit, and a local storage. The client is further adapted and configured to monitor a bandwidth currently available for streaming of a segment file pertaining to the selected content asset from a server to the client; to register a selected content asset by receiving a user-originating request identifying the selected content asset; to select an adequate segment quality level to be requested based on the currently available bandwidth; to adaptively select a segment to be requested contingent upon the local availability or quality level of file segments; to request the segment from the content providing server in the specified adaptively selected adequate segment quality level; to receive the requested segment in a current segment quality level corresponding to the adaptively selected adequate quality level; to store locally the received segment in association with information regarding its quality level; and to render received file segments pertaining to the content file in a manner as specified by a received manifest file pertaining to the content file.

The client may further be adapted and configured to investigate whether a rendition of the selected content asset is stored locally; to select a file segment to be requested contingent upon a consecutive segment order specified in the manifest file; to select a file segment (s[x]) to be requested contingent upon its current associated quality level; to repeat a request for each next-to-play segment (s[k+1]); and to select storage location based on previously received instruction, thereby enabling the user of the client to indicate whether or not local storage is desired.

A third aspect of the invention is a computer program comprising program instructions for causing a computer to perform the method of any of the steps of the method according to the first aspect of the invention when said program is run on a computer.

A fourth aspect of the invention is a computer program on a carrier and comprising computer executable instructions for causing a computer to perform the method of any of the steps of the method according to the first aspect of the invention, when said program is run on a computer. The carrier may be a record medium, computer memory, read-only memory or an electrical carrier signal.

A fifth aspect of the invention is a computer program product comprising a computer readable medium, having thereon: computer program code means, when said program is loaded, to make the computer execute the process of the steps of the method according to the first aspect of the invention.

BRIEF DESCRIPTION OF THE DRAWINGS

In order to explain the invention in more detail and the advantages and features of the invention, a preferred embodiment will be described in detail below, reference being made to the accompanying drawings, in which.

DETAILED DESCRIPTION

Figure 1:
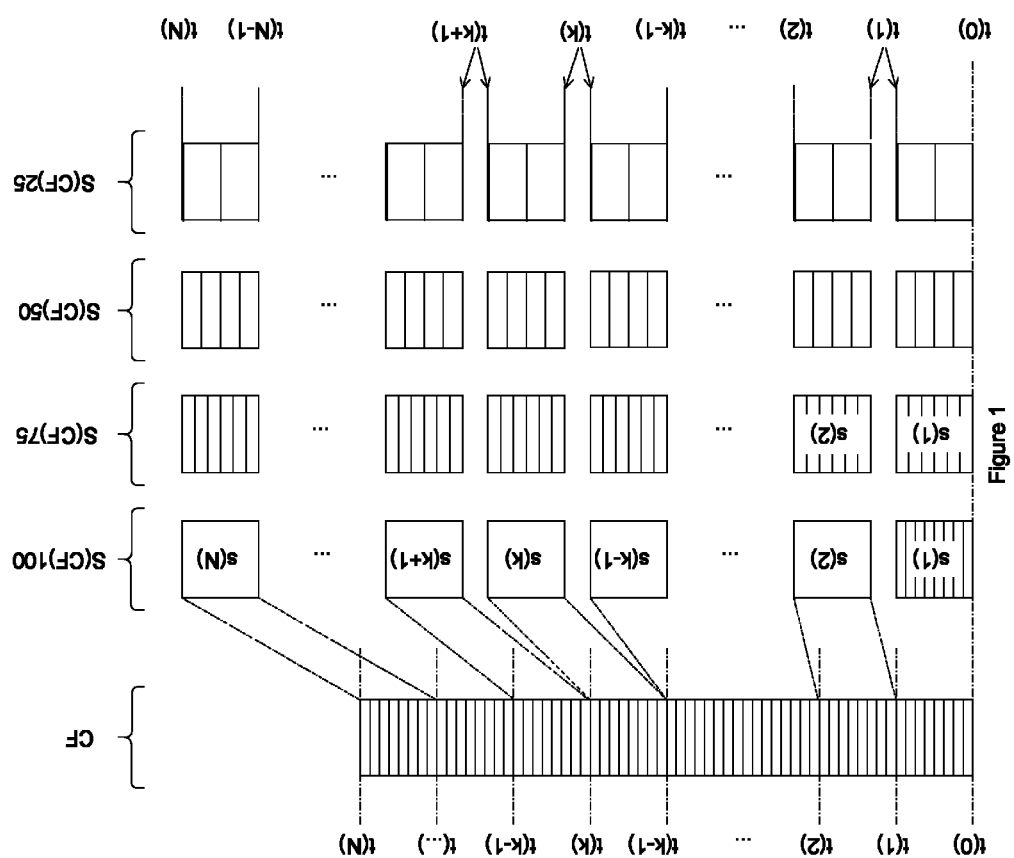
FIG. 1 shows general principles regarding denomination of file segments.

Permanently storing of a streamable content file is an advantage to a user who knows or conjectures that he or she will want to playback the streamed content more than once. Therefore it would be an advantage for the end-user of the content to be able to select, prior to streaming, whether or not the content file should be permanently stored. Further, even though the end-user may not plan multiple rendering, a content provider or a network operator may desire to implement permanent storing of content that is likely, based on user context e.g., to be selected for rendering by the end-user again in the future. From the content provider's perspective, this is an advantage, in that it enables the content provider to provide an improved service offering, with reduced initial delay when rendering locally stored content. From this follows that the user-perceived quality of service, i.e. rendered content quality, delivered by the content provider is increased. From a network operator perspective permanent storing is an advantage e.g. for network load balancing, in that the same content must not be streamed multiple times, and network load can therefore be reduced in general, and in particular scheduled for off-peak hours.

The rendering quality of content retrieved through adaptive streaming typically varies over time. This is a problem since it prevents the adaptive streaming end user from having a good user experience the first time consuming the content asset. Further, it prevents the end user from permanently storing the streamed content for easy and/or fast future access to content asset experience of best possible quality. For the purpose of this patent application "content asset" is defined as the intellectual content per se, i.e. whatever gives the intellectual experience, where as "content file" is defined as the technical/functional representation of the content asset. While a content asset and an asset segment respectively, are singulars, their respective representations in the form of content files CF's or file segments may exist in multiple versions, distinguished by e.g. different video encoding types, or, particularly relevant to this patent application, different bit rate levels. Further a content file CF or a file segment s of relatively lower bit rate typically, when rendered, gives a relatively lower e.g. viewing or audio quality experience to the user, while he or she may still have received the entire intellectual content of the content asset. Throughout this patent application, the terms "quality" and "bit rate" may therefore be interchangeably used unless no further specification is given.

An apparatus and a method according to the present invention enable permanently stored content downloaded via adaptive streaming to progressively enhance its quality over time. Embodiments of the present invention support HTTP Live Streaming, but may also support other adaptive streaming technologies.

Stored and downloaded content may comprise a sequence of streamable segments, or fragments of content, such as e.g. a video clip or a feature film clip. For the purpose of this patent application, a content file unit, such as e.g. a feature film, comprises at least all the necessary data, metadata etcetera, necessary to render/playback the content in its entirety. A content file comprises all the data that is the technical representation of the content asset. A content asset may be logically split into asset segments with a determined consecutive rendering order. A content file may be split into multiple content file segments with a determined consecutive playback order.

Segmentation and time stamping to create a content file unit may be performed in various ways, but as a result, the content file is partitioned into file segments, with a defined duration, and succession order in a played-back content file. Further, each asset segment corresponding to each file segment is duplicated in a multiple of versions of various bit rate level and therefore consequently corresponding various playback. Typically content file segments of the highest bit rate, corresponding to the highest playback quality, has the same bit rate as the original source content file.

Switch-over points are defined such that each set of representations of an identified file segment may be synchronized and otherwise managed among themselves, and further among representations of other file segments in the series of identified file segments. The switch-over points as well as the file names of the different segment may be documented in a so called manifest file. A content file manifest is comprised in the content file unit, and is always downloaded by the media player upon beginning of streaming of a content file. The manifest file enables the media player to manage available resources and uniform resource location (URL) requests to the server as it progresses through the content file.

For the purpose of this patent application we define the following notation, which is also illustrated in FIG. 1. A content file CF having a playback time of T seconds may be partitioned into N file segments s, each of playback duration d=T/N seconds. A full set of segments S(CF) partitioned from CF comprises all the N file segments s needed to playback the entire content file CF (though other metadata including the manifest file comprised in the content file unit may be needed for playback in addition). A segment s comprised in S(CF) may be referred to as s(k), where k indicates the particular file segment's sequential playback order in relation to the other segments s comprised in S(CF). For the purpose of this patent application, hence, s(1) denotes the first-in-time segment, and s(N) denotes the last-in-time segment. Under normal circumstances, once the file segment s(k=N) has been played back, the entire content file CF has been played back, and no additional segments remain to be fetched or rendered. As an example, if we assume that the content file CF has been selected for normal playback, and that the segment s(k) is currently being rendered, this indicates that the file segment s(k−1) has been rendered immediately before s(k) and further that the file segment s(k+1) (next-to-play segment) should be rendered immediately after s(k), unless k=N. Further, each segment s(k) may be reproduced as several bit rate versions, from versions with a higher bit rate, to versions with a relatively lower bit rate. The multiple bit rate versions enables retrieval of a segment with as high bit rate as a current streaming bandwidth will allow at each point in time.

In an accompanying manifest file, each segment of a complete set of segments necessary to render the asset in its entirety is defined with identity and information enabling retrieval, and its bit rate Q specified. FIG. 1 attempts to illustrate this through four different exemplary sets S(CF)Q, namely S(CF)100, S(CF)75, S(CF)50 and S(CF)25, having exemplary bit rates equal to 100%, 75%, 50% and 25% respectively of CFs original bit rate. In FIG. 1, the difference in bit rate is also symbolically indicated by the varying density of the line filling.

Figure 2:
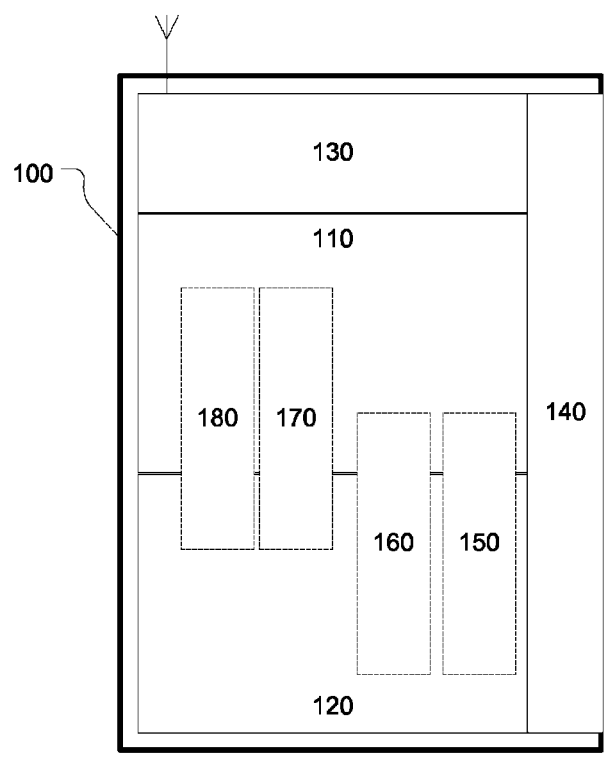
FIG. 2 shows a schematic view of an apparatus according to the present invention.

An HTTP Adaptive Streaming (HAS) client 100 apparatus according to the present invention will now be described in relation to FIG. 2. Embodiments of the present invention are particularly useful for long-form content, such as feature films or the like. The client 100, such as e.g. a tablet computer "tablet PC", a mobile telephone or a laptop computer comprises all the components that enable regular use, such as a central processing unit 110, a memory unit 120, and interfaces 130 towards the Internet and/or other networks, wired or wireless. Via the interfaces 130, the client is connectable to a content providing server.

Further, the processing unit 110 and the storage unit 120 comprised in the client implement a HAS unit 150 and a media player unit 160. Further the processing unit 110 and the memory unit 120 may implement a local storage unit 170, and/or a local cache unit 180 comprised in the client 100. In FIG. 2, logical/functional entities implemented by the processing unit 110 and the memory unit 120, e.g. hardware and/or software, comprised in the client 100, are illustrated as boxes with dashed borders. Though the dashed boxes in FIG. 2 may not be explicitly connected by lines, it is to be understood that the respective logical/functional entities are implemented as interconnected to operate according to embodiments of the present invention. Further, though described throughout this patent application as separate entities, the media player unit 160 may be implemented as comprised in the HAS unit 150.

The media player unit 160 is adapted and configured to manage video assets, thereby enabling video assets to be rendered visually and audibly on a graphical/audio user interface 140 (GUI) also comprised in or functionally coupled to the client 100. The media player unit 160 may further be adapted and configured to implements playback controls for the GUI 140. The media player unit 160 is further adapted and configured to decode and display content assets on a screen comprised in or functionally coupled to the client 100.

The local storage 170 is adapted and configured to store file segments s. Video asset segments s stored in the local storage 170 are visible and accessible to the user. The local cache 180 is adapted and configured to store video asset segments s so that they may be accessible to the media player unit 160, even though they may not be visible to the user. In exemplary embodiments of the present invention, a video asset associated with a content file CF is visible to the user only if a corresponding complete set of segments S(CF) is locally stored. In other exemplary embodiments, the video asset may be visible to the user in the local storage 170, even though only a subset of the complete set of segments S(CF) associated with video asset has been stored.

The HAS unit 150 is adapted and configured to retrieve file segments s from a server or from the local storage unit 170 or the local cache unit 180. The HAS unit 160 is further adapted and configured to manage one or many received content file segments s. Further, the HAS unit 150 is adapted and configured to write segments s to the local storage unit 170 or the local cache unit 180 as defined above. The HAS unit 150 is further adapted and configured to adjust the download bit rate from a server to a bit rate sufficiently low to enable the client 100 to handle it without having to halt rendering of the content asset while buffering. The adaptation is performed through seamless switching between streams of different bit rates.

While the network is only aware of network performance, the media player unit 160 is aware of the client's 100 final rendering quality. The client 100 may therefore request a next-to-play segment s(k+1) of a higher bandwidth version, than a currently played back segment s(k) if the client's 100 bandwidth capacity increases, or analogously, if the client's 100 bandwidth capacity decreases, the client 100 may adaptively select a relatively lower-bit rate version of the next-to-play segment s(k+1) to be rendered next. In each instance, the client adaptively selects an adequate level of segment quality, e.g. bit rate, to be requested based on the currently available bandwidth.

Figure 3:
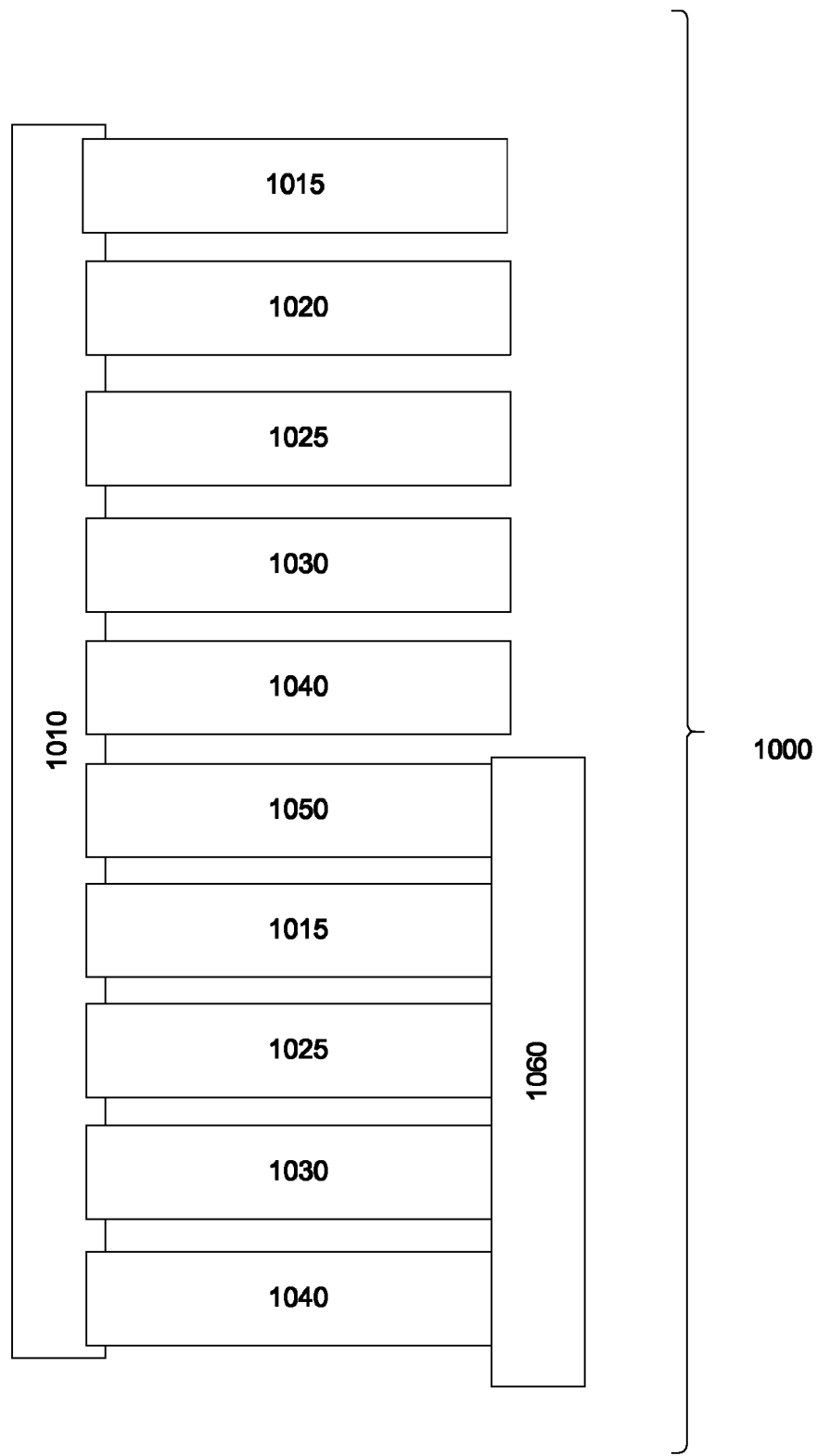
FIG. 3 shows a flowchart of a method of according to the present invention.

An aspect of the present invention is a method 1000 in a client 100 for adaptive streaming of a selected content asset. The method 1000 will now be described in relation to FIG. 3. FIG. 3 is a schematic overview of an exemplary embodiment of the method 1000 according to an aspect of the present invention.

In a monitoring step 1010, the media player unit 160 comprised in the client 100 monitors the bandwidth currently available for streaming of HAS file segments s. The monitoring step 1010 may be performed intermittently, periodically or continuously.

In a selecting content 1015 step the media player unit 160 may receive a user-originating request for a selected content asset. The user-originating request may comprise a URL that enables the media player unit 160 to identify a content unit file CF corresponding to the selected content asset. Further, the media player unit 160 may use the URL to determine whether the requested content unit file CF is a HAS asset. If the selected content unit CF is a HAS asset, the media player unit 160 inquires the HAS unit 150 for the selected content unit CF. Upon receiving the inquiry, the HAS unit 150 investigates whether the selected content asset is stored locally. In certain embodiments of the present invention, the content file pertaining to the selected content asset may be stored in the local storage unit 170. In certain embodiments the content asset may be stored in the local cache 180. Hence, the HAS unit may investigate either or both of local storage 170 and local cache 180.

If the CF associated with the selected content asset is not stored locally, the HAS unit adaptively selects an adequate level of segment bit rate based on currently available streaming bandwidth between the server and the client. The HAS unit 150 may poll the media player unit 160 for the currently available bandwidth upon determining that the content asset is not stored locally, and then poll again prior to requesting each consecutive segment. This is performed in an adaptively selecting bit rate step 1020. Further the HAS unit may select a next-to-play segment s(k+1), for k=0 to k=(N−1) in an selecting segment step 1025. For the purpose of rendering the complete content asset, this adaptively selecting step 1025 is repeated for each next-to-play segment s(k+1) until and including when the next-to-play segment is the last-most segment s(N).

In a requesting segment step 1030 the HAS unit 150 then requests each adaptively selected segment s of the content file CF from the server to which the URL points. In this case the adaptively selected segment s is the next-to-play segment s(k+1) as has been described above. In the request, the HAS unit 150 specifies a bit rate version to be streamed that has most recently been adaptively selected to be adequate.

In a receiving segment step 1040 the HAS unit 150 receives, and further feeds to the media payer unit 160, each segment s (k+1) of a current level of quality Q corresponding to the adaptively selected level of quality; and in a storing locally step 1050, the received file segment is stored in association with its current level of quality Q. Prior to starting playback of a content unit selected through a URL pointing at a global server, the end-user may in the storing locally 1050 step, select to store the content unit locally. In certain embodiments of the present invention, the client may prompt the end-user to indicate an identification of the content unit to be locally stored. The content unit is then stored in persistent memory thereby enabling the end-user to select it through a local pointer provided by the media player unit 160, e.g. a "local media tab" displayed by the GUI 140. If the user does not want to store the content unit locally, the media player unit 160 may choose to store it in the local cache, transparently to the user, upon previous instruction from e.g. a content provider or a network operator.

Note, that even though the HAS unit 150 may have adaptively selected, and subsequently requested, a certain bit rate level as adequate for streaming, for various reasons, the received current level Q may still be lower than requested. For instance, a network operator may have instructed a providing server to reduce network load. Therefore, in certain embodiments, the received current level Q is detected and associated in the local storage, rather than the adaptively selected requested level Q.

If, in the selecting content step 1015 it is determined that selected content file CF is stored locally, then the next-to-play segment s(k+1) is repeatedly retrieved from where it is locally stored and fed to the media player unit 160 to enable rendering. For the purpose of clarification, if no previous file segment s pertaining to the selected content asset has been rendered yet, i.e. if k=0, the next-to-play segment is the first-in-time file segment s(1). For each rendered segment s(k), the HAS unit 150 determines whether the next-to-play segment is the last-in-time segment of the segments pertaining to the selected content. If so, no further attempts to retrieve next-in-time segment has to be done.

In embodiments of the present invention, the client 100 may perform an adaptively selecting segment 1025 step comprising adaptively selecting a locally stored segment s(x) of the set of segments S(CF) contingent upon s(x)'s associated local current level of quality Q. Upon performing an adaptively selecting bit rate step 1020, a higher quality version s(x)Q+ of the selected segment s(x) is then requested in a requesting segment step 1030, provided that the higher quality Q+ has been selected as adequate. This enables the quality of locally stored segments s to be increased from a relatively lower bit rate Q to a relatively higher bit rate Q+.

If the requested level of quality Q+ may be provided, the HAS unit 150 may then receive a higher quality version of the requested file segment s(x) from the server and store it in the Local Storage 170 or in the local cache 180, depending on earlier end-user choice. If the content unit pertaining to the content file CF is currently being rendered, the segment may be adaptively selected among a set of "later-in-time"-segments, i.e. any segment s(x), where x>k, that remain to be rendered during the current playback. In certain embodiments of the method 1000 of the present invention, a highest level of quality is defined and known to the client, and the client therefore does not attempt to increase the locally stored segment bit rates above this highest quality level.

In a rendering step 1060, each segment comprised in the set of segments S(CF) is sequentially rendered. In embodiments where a content unit is rendered for at least the second time, the media player 160 may use the locally stored segments, but will in parallel use the network to download segments of higher quality, if needed, to replace the locally stored segments that are of low-quality.

If the HAS unit 150 can execute and run in the background, independently of the media player, it may continue to reparse and improve segments even if no content is rendered at present.

EXAMPLE SEQUENCE

1. The End-user requests the Media Player to view video asset V from URL U.
2. The Media Player deducts from U that the asset is an HAS asset and requests segments from the HAS Function.
3. The HAS Function verifies if the asset is present locally (in Local Storage or Local Cache). If yes path A is followed, otherwise path B.

Sequence Path A (Not the First Time this Asset is Viewed)

4. The HAS Function retrieves the first-in-time video asset segment from the Local Storage/Cache and feeds to the Media Player.

5. The HAS Function examines the future-in-time video asset segments and finds the segment that has the lowest quality[1].
6. It starts to download a higher quality version of this segment from the server and store it in the Local Storage/Cache (depending on earlier end-user choice)
7. Steps 5-6 are repeated until the Media Player needs the next-in-time segment which then is fed to the Media Player before steps 5-6 are resumed again.

Sequence Path B (the First Time this Asset is Viewed)

8. The HAS Function examines the currently available bandwidth and requests the first segment from the server in as high quality as possible given the available bandwidth.
9. Segment is fed to the Media Player but also stored in either the Local Storage or the Local Cache (depending on earlier end-user choice).
10. Steps 8-9 are repeated for all consecutives segments in the video asset.

Figure 4:
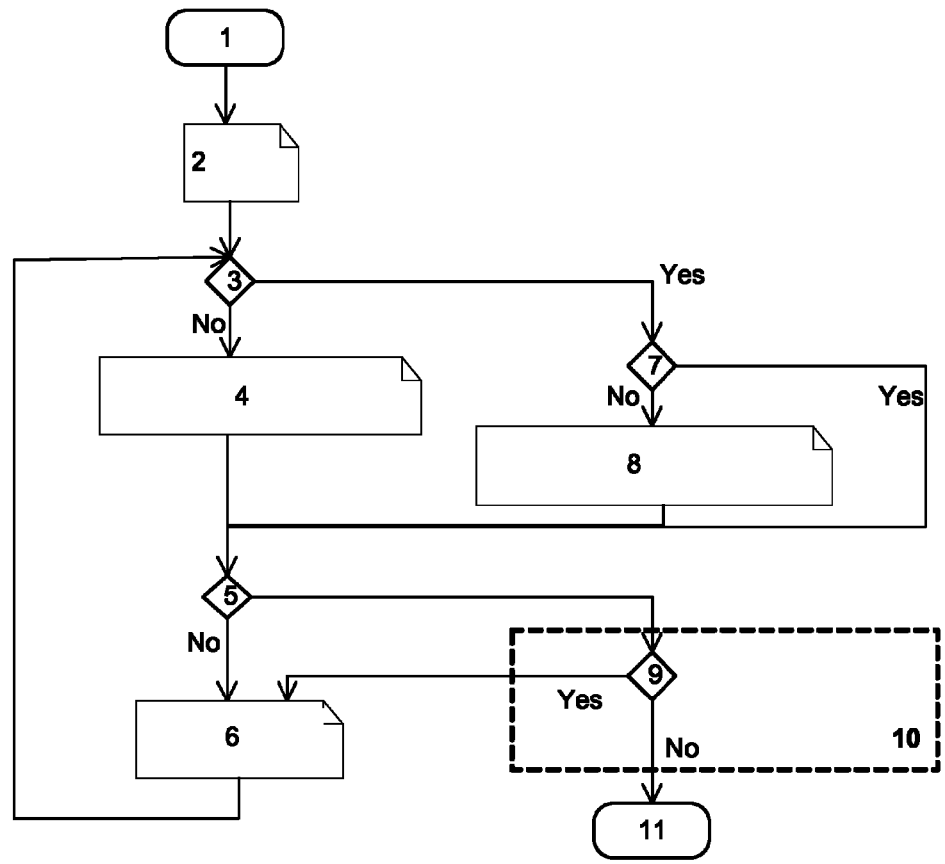
FIG. 4 is an illustration of state-machine-type intended to exemplify downloading and retrieval procedures according to the present invention.

FIG. 4 provides a HAS function state machine of an exemplary downloading/retrieval part of the HAS function, i.e. essentially what is described in steps 5-6 above. The following numerals refer to states as illustrated in FIG. 4:

1: new content
2: read manifest after first segment
3: segment exists in storage/cache?
4: retrieve new segment considering available bandwidth and buffer
5: last segment of content file?
6: read next segment
7: is segment of highest quality?
(A More Elaborate Algorithm than just Finding the Lowest Quality Segment may be Used)
8: update segment with higher quality considering available B/W and buffer.
9: any segment with lower quality?
10: OPTIONAL if possible to reparse downloaded segments
11: finished downloading content The below section explores the possibility for standardization based on the work done in Open IPTV Forum (OIPF) and the Declarative Application Environment (DAE) specification.

There are two options for viewing HAS.

1. Directly requesting viewing of a content using mpeg/video embedded video object and setting the Data property to a remote server. This assumes immediate consumption and possible caching of the stream.
2. Request first to download the stream through the Download Manager interface. The stream is stored locally in the client. The content may viewed at any point by subsequently using the mpeg/video embedded video object and setting the Data property to a local URL.

The change is recommended to be in how the strategy is set in buffering strategy (section 7.14.8.2) of DAE specification. When setting the method setRepresentationStrategy( ) it may be possible to indicate through a new argument an option for reparsing previously downloaded segments. If argument is set to true then previously downloaded segments are rechecked after completing the download.

Additionally it may be possible to indicate a "new" buffering strategy through method setBufferingStrategy( ). Without having to indicate min, max and position it is left completely to the client to "reparse" downloaded content over time to best quality. So the strategy could be to "reparse_strategy" where client does an optimized download and then redownloads the content. This could be used in both cases options (1) and (2) indicated above.

The aspects of the present invention give the following, and other, mentioned advantages.

Embodiments of the present invention combine the advantages of HTTP Adaptive Streaming to consume a content asset immediately at a content quality that corresponds to the available bandwidth and the ability to enhance the quality when bandwidth allows. This is done by taking advantages of locally storing/cache downloaded content by introducing a mechanism that allow a client to improve the quality of the stored content over time.

A mobile device that is roaming with different data connection speeds can update previously downloaded segments with a higher quality for enhanced user experience.

An end-user may download content at a lower quality in order to later update with a higher level quality when time and/or resources permits. For example an end-user may choose to perform a quick download of a movie to be viewed while on the road but when there is more time download at a higher quality.

Embodiments of aspects of the present invention do not require any modification of content already prepared for adaptive streaming, or of any server side components.

The end user may have control of the quality to be rendered or the service provider can in behalf of the user set the adaptive streaming strategy on the terminal client. The control is further explained above, in relation to standardization considerations.

The invention claimed is:

1. A method in an adaptive streaming enabled client for adaptive streaming, local storing and post-storing quality increase of a content file (CF) rendition of an associated selected content asset, comprising:
monitoring a bandwidth (BR) currently available for streaming of one or more file segments pertaining to the selected content asset from a content providing server to the client;
receiving a user-originating request identifying the selected content asset; adaptively selecting a segment quality level to be requested based on the currently available bandwidth (BR);
selecting a file segment of the one or more file segments pertaining to the selected content asset to be requested based on a determination of a local availability and/or quality level of locally previously stored file segments;
requesting the selected file segment from the content providing server in the specified adaptively selected segment quality level;
receiving the requested file segment in a current segment quality level (Q) corresponding to the adaptively selected quality level;
storing locally the received file segment in association with information regarding its quality level (Q); and
rendering received file segments pertaining to the content file (CF) including the requested file segment in a manner as specified by a received manifest file pertaining to the content file (CF) responsive to the received user-originating request,
wherein the locally previously stored file segments include a first previously stored file segment that pertains to the content file and that has a first current segment quality level that is lower than the adaptively selected quality level,
wherein the locally previously stored file segments include a second previously stored file segment that pertains to the content file and that has a second current segment quality level that is higher than the first current segment quality level of the first previously stored file segment, and wherein the selecting the file segment comprises selecting a file segment corresponding to the first previously stored file segment based on a determination that the first current segment quality level of the first previously stored file segment is lower than the adaptively selected quality level and lower than the second current segment quality level of the second previously stored file segment.

2. The method of claim 1, wherein receiving the request comprises receiving a uniform resource locator specifying a location of a rendition of the identified selected content asset, the method further comprising:

determining, based on the uniform resource locator, whether the rendition is streamable.

3. The method of claim 1, further comprising determining whether a rendition (CF) of the selected content asset is stored locally.

4. The method of claim 1, wherein selecting the file segment comprises selecting the file segment to be requested based on a consecutive segment order specified in the manifest file.

5. The method of claim 1, wherein selecting the file segment comprises selecting the file segment to be requested based on the selected file segment's current associated quality level.

6. The method of claim 1, further comprising sequentially requesting each next-to-play segment.

7. The method of claim 1, wherein selecting the file segment comprises determining whether the selected file segment's current level of quality (Q) is lower than the selected level of quality.

8. The method of claim 1, wherein storing locally comprises selecting a storage location based on a previously received instruction.

9. The method of claim 1, further comprising:

determining whether a plurality of file segments pertaining to the content file (CF) are locally previously stored; and determining a lowest current segment quality level (Q) among current segment quality levels (Q) of the plurality of locally previously stored file segments pertaining to the content file (CF); and determining whether the determined lowest current segment quality level (Q) is less than the adaptively selected segment quality level, wherein selecting the file segment comprises selecting a file segment corresponding to one of the plurality of locally previously stored file segments with the determined lowest current segment quality level (Q) that is less than the adaptively selected segment quality level.

10. The method of claim 1, wherein the second current segment quality level of the second previously stored file segment is higher than or equal to the adaptively selected quality level, and wherein the rendering comprises rendering, responsive to the received user-originating request, the received file segment corresponding to the first previously stored file segment and further comprises rendering the second previously stored segment.

11. A client enabled for adaptive streaming, local storing and post-storing quality increase of a content file (CF) rendition of an associated selected content asset, the client comprising:

a central processing unit, a memory unit, and a network interface, the memory unit comprising a computer program that when executed by the central processing unit causes the central processing unit to perform operations comprising:

monitoring a bandwidth (BR) currently available for streaming of one or more file segments pertaining to the selected content asset from a content providing server to the client;

receiving a user-originating request identifying the selected content asset; adaptively selecting a segment quality level to be requested based on the currently available bandwidth (BR);

selecting a file segment of the one or more file segments pertaining to the selected content asset to be requested based on a determination of a local availability and/or quality level of locally previously stored file segments;

requesting the selected file segment from the content providing server in the specified adaptively selected segment quality level;

receiving the requested file segment in a current segment quality level (Q) corresponding to the adaptively selected quality level;

storing locally the received file segment in association with information regarding its quality level (Q); and rendering received file segments pertaining to the content file (CF) including the requested file segment in a manner as specified by a received manifest file pertaining to the content file (CF) responsive to the received user-originating request, wherein the locally previously stored file segments include a first previously stored file segment that pertains to the content file and that has a first current segment quality level that is lower than the adaptively selected quality level, wherein the locally previously stored file segments include a second previously stored file segment that pertains to the content file and that has a second current segment quality level that is higher than the first current segment quality level of the first previously stored file segment, and wherein the selecting the file segment comprises selecting a file segment corresponding to the first previously stored file segment based on a determination that the first current segment quality level of the first previously stored file segment is lower than the adaptively selected quality level and lower than the second current segment quality level of the second previously stored file segment.

12. The client of claim 11, wherein the operations further comprise determining whether a rendition (CF) of the selected content asset is stored locally.

13. The client of claim 11, wherein selecting the file segment comprises selecting the file segment to be requested based on a consecutive segment order specified in the manifest file.

14. The client of claim 11, wherein selecting the file segment comprises selecting the file segment to be requested contingent upon its current associated quality level.

15. The client of claim 11, wherein the operations further comprise sequentially requesting each next-to-play segment.

16. The client of claim 11, wherein the operations further comprise selecting a storage location based on a previously received instruction.

17. A computer program product comprising a non-transitory computer readable storage medium having computer readable program instructions embodied therewith, the computer readable program instructions when executed by a processor in a computer causes the processor to perform operations comprising:

- monitoring a bandwidth (BR) currently available for streaming of one or more file segments pertaining to a selected content asset from a content providing server to a client;
- receiving a user-originating request identifying the selected content asset;
- adaptively selecting a segment quality level to be requested based on the currently available bandwidth (BR);
- selecting a file segment of the one or more file segments pertaining to the selected content asset to be requested based on a determination of a local availability and/or quality level of locally previously stored file segments;
- requesting the selected file segment from the content providing server in the specified adaptively selected segment quality level;
- receiving the requested file segment in a current segment quality level (Q) corresponding to the adaptively selected quality level;
- storing locally the received file segment in association with information regarding its quality level (Q); and
- rendering received file segments pertaining to a content file (CF) including the requested file segment in a manner as specified by a received manifest file pertaining to the content file (CF) responsive to the received user-originating request,
- wherein the locally previously stored file segments include a first previously stored file segment that pertains to the content file and that has a first current segment quality level that is lower than the adaptively selected quality level,
- wherein the locally previously stored file segments include a second previously stored file segment that pertains to the content file and that has a second current segment quality level that is higher than the first current segment quality level of the first previously stored file segment, and
- wherein the selecting the file segment comprises selecting a file segment corresponding to the first previously stored file segment based on a determination that the first current segment quality level of the first previously stored file segment is lower than the adaptively selected quality level and lower than the second current segment quality level of the second previously stored file segment.

* * * * *